United States Patent [19]

Hirmer

[11] Patent Number: 6,034,515
[45] Date of Patent: Mar. 7, 2000

[54] CURRENT LIMITING CIRCUIT

[75] Inventor: Gerald Hirmer, Mantel, Germany

[73] Assignee: Siemens Aktiengesellschaft, Munich, Germany

[21] Appl. No.: 09/101,982

[22] PCT Filed: Jan. 16, 1997

[86] PCT No.: PCT/DE97/00069

§ 371 Date: Apr. 26, 1999

§ 102(e) Date: Apr. 26, 1999

[87] PCT Pub. No.: WO97/27657

PCT Pub. Date: Jul. 31, 1997

[30] Foreign Application Priority Data

Jan. 22, 1996 [DE] Germany .............................. 196 02 121

[51] Int. Cl.[7] .............................. G05F 1/573; G05F 1/40; H02H 7/10

[52] U.S. Cl. .......................... 323/277; 323/279; 323/908; 363/50

[58] Field of Search ..................................... 323/277, 273, 323/274, 279, 901, 908; 363/49, 50

[56] References Cited

U.S. PATENT DOCUMENTS

| 4,750,079 | 6/1988 | Fay et al. ................................ 323/277 |
| 4,800,331 | 1/1989 | Vesce et al. ............................ 323/277 |
| 5,004,970 | 4/1991 | Barou ..................................... 323/277 |
| 5,079,455 | 1/1992 | Mccafferty et al. .................... 307/568 |
| 5,574,632 | 11/1996 | Pansier ................................... 323/908 |

*Primary Examiner*—Peter S. Wong
*Assistant Examiner*—Bao Q. Vu
*Attorney, Agent, or Firm*—Kenyon & Kenyon

[57] ABSTRACT

A current limiting circuit in which, when the input DC voltage is raised from zero volts to the reference voltage, an output DC flows through the connected load only when the value of the input DC voltage rises to a value above an undervoltage threshold value which is below the reference voltage.

9 Claims, 2 Drawing Sheets

006,034,515

CURRENT LIMITING CIRCUIT

FIELD OF THE INVENTION

The present invention relates to a current limiting circuit. This circuit is supplied with an input DC voltage and delivers an output DC current, the output DC current which flows through a connected capacitive load being limited.

BACKGROUND OF THE INVENTION

A circuit which limits the direct current flowing through a capacitive load when this load is connected to a DC voltage source is discribed in German Patent No. 40 13 731 C2.

In the case of the circuit which is described in the cited document, an output DC current is always delivered at the output connections when an input DC voltage is applied. As a consequence of this, a current flow through a connected load occurs even at low input DC voltages, so that the connected load is operated in unacceptable voltage ranges.

Another conventional circuit is described in European Patent No. 0 272 514. In this circuit, the maximum possible output DC current rises when the input DC voltage increases from zero volts, proportionally with the input DC voltage.

An object of the present invention is therefore to avoid such unacceptable operating states of the connected load, particularly in the case of excessively low input DC voltages and in addition, to sharply reduce the transition between a phase in which a relatively low maximum possible output DC current can be delivered and a phase in which a significantly higher maximum possible output DC current can be delivered.

The object is achieved in that when the input DC voltage is raised from zero volts to the reference voltage, an output DC current flows through the connected load only when the value of the input DC voltage rises to a value above an undervoltage threshold value which is below the reference voltage.

The desired output response can be implemented through circuit engineering particularly simply in accordance with the present invention. Only a small number of simple components are required to construct the circuit, the dimensioning of the undervoltage zener diode, in particular, defining the undervoltage threshold value. In an exemplary the specific implementation, this undervoltage threshold value is 7.5 volts.

If, when the input DC voltage is raised from zero volts to the reference voltage, the maximum possible output DC current rises suddenly, the input DC voltage exceeding an activation threshold value which is below the reference voltage, this results in greatly shortening the transition between a phase in which a relatively low maximum possible output DC current can be delivered and a phase in which a considerably higher maximum possible output DC current can be delivered.

In accordance with the present invention, the power supply to the connected load is stabilized in that, when the input DC voltage is reduced from a voltage value which is above the activation threshold value to zero volts, the maximum possible output DC current falls suddenly only when a notch threshold value is reached which is below the activation threshold value.

The output response of the circuit in turn can be achieved by an implementation which is particularly simple in circuit engineering terms, in accordance with the present invention.

In order to protect the connected load and, in the same way, to protect the components which are located in the current limiting circuit, it is furthermore provided that the circuit has overvoltage protection, so that no output DC current flows through a connected load as soon as the input DC voltage exceeds an overvoltage threshold value which is above the reference voltage.

The described output response of the circuit can be achieved in turn by a simple implementation in circuit engineering terms, the dimensioning of an overvoltage zener diode, in particular, defining the overvoltage threshold value. In an exemplary implementation, this overvoltage threshold value is 36 volts.

DETAILED DESCRIPTION

Figure 1:
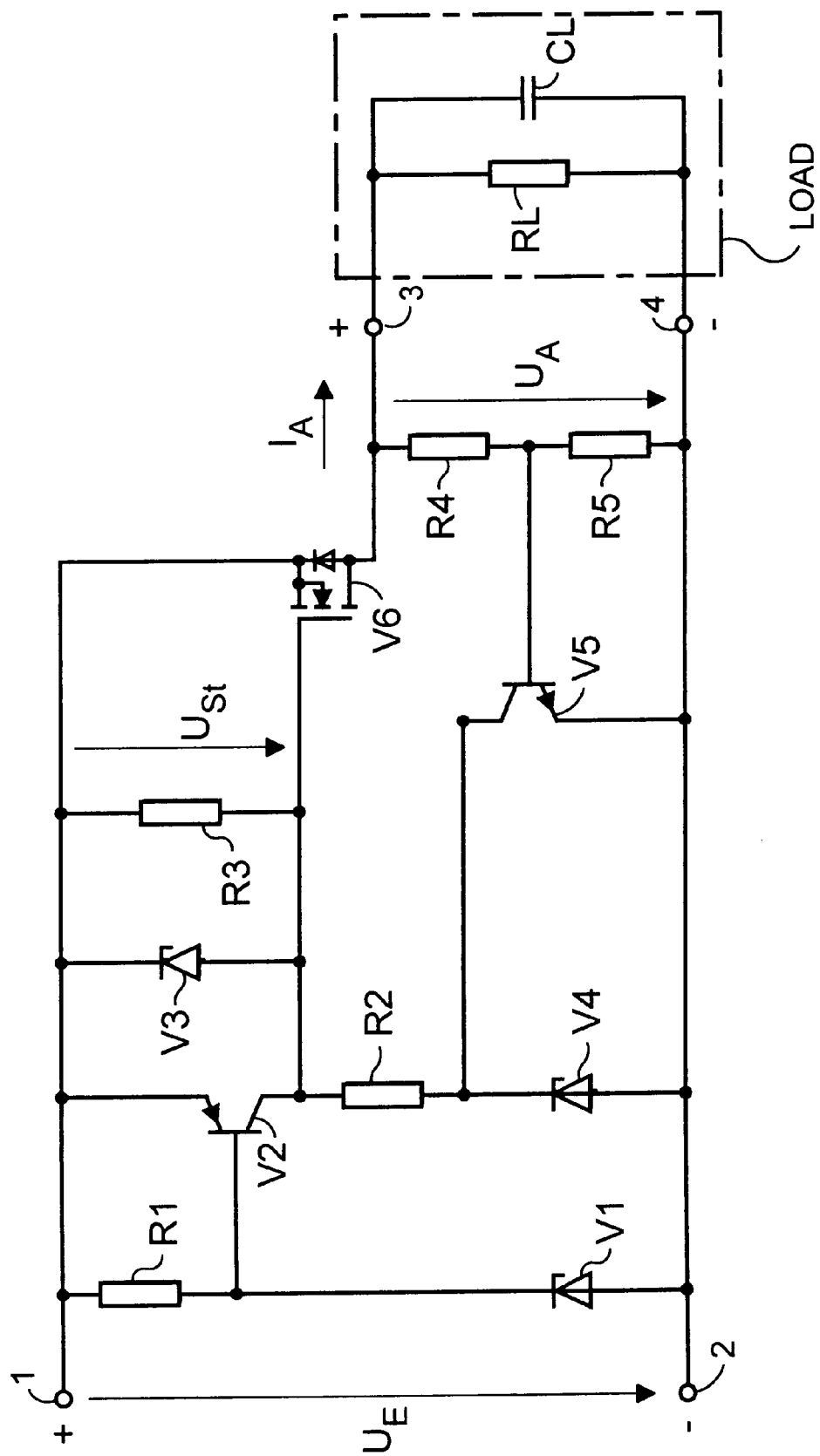
FIG. 1 shows a current limiting circuit, in accordance with the present invention.

FIG. 1 depicts a current limiting circuit having a positive and a negative input connection 1, 2, to which, in each case, the positive and the negative potential, respectively, of an input DC Voltage $U_E$ can be applied. Furthermore, a positive and a negative output connection 3, 4 can be seen, from which, in each case, the positive and the negative potential, respectively, of an output DC voltage $U_A$ can be tapped off.

On the output side, the current limiting circuit supplies a maximum possible output DC current $I_A^{max}$, an output DC Current $I_A$ flowing through connected load RL, CL if input DC voltage $U_E$ is sufficient.

Figure 2:
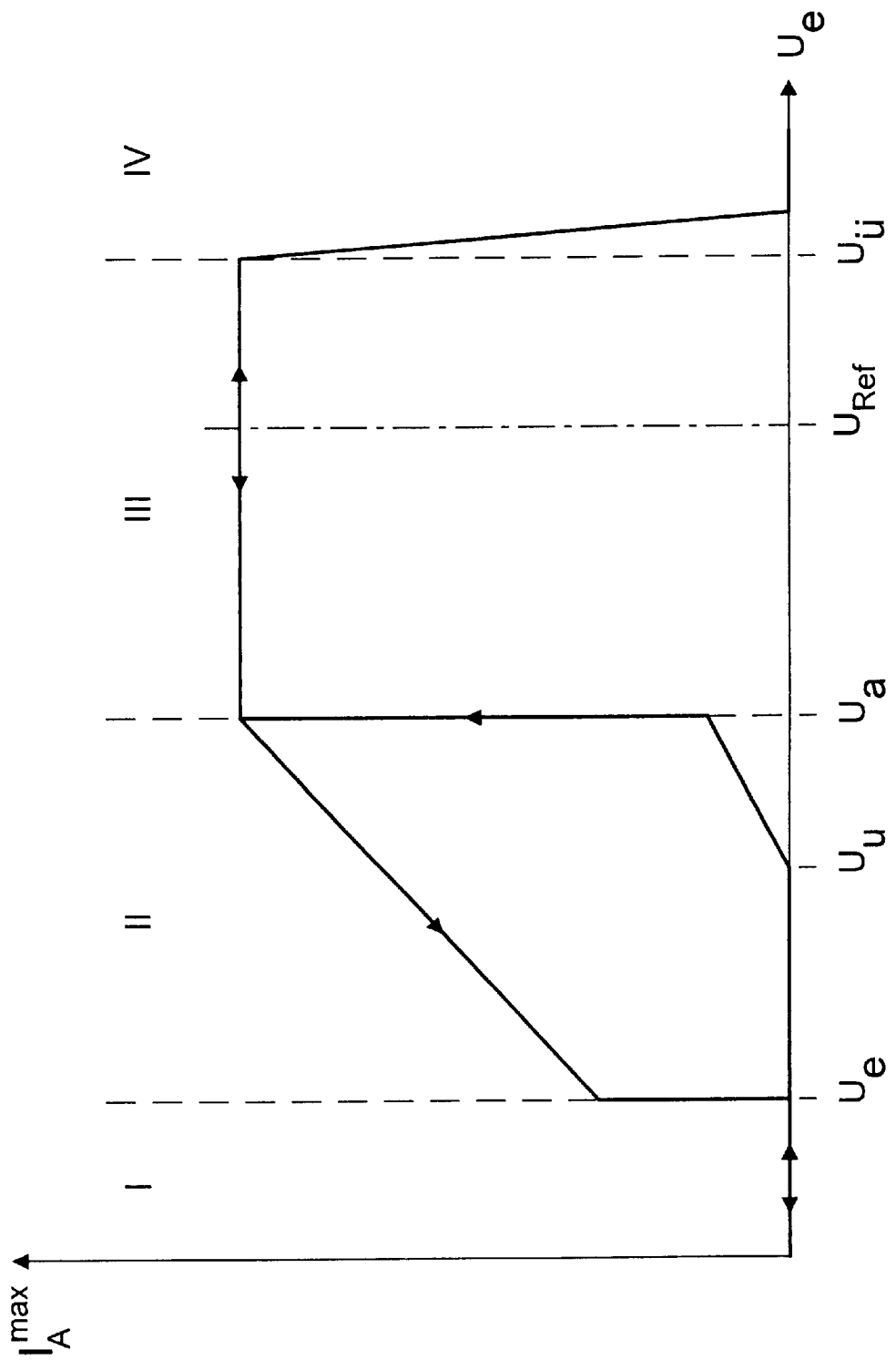
FIG. 2 shows the output response of the current limiting circuit of FIG. 1.

FIG. 2 shows the output response of the current limiting circuit according to FIG. 1. Four regions (I, II, III, IV) of different output responses with respect to the maximum possible output DC current $I_A^{max}$ can be seen for the case when input DC voltage $U_E$ is rising:

I) It can be seen that the maximum possible output DC current $I_A^{max}$ is zero for input DC voltages $U_E$ below an undervoltage threshold value $U_U$. In this case, no output DC current $I_A$ flows through a connected load RL, CL.

This output response is achieved by the appropriate interaction of the following components which are contained in the current limiting circuit:

- a normally-off MOSFET V6 having a gate, a source and a drain connection,
- a parallel circuit including a resistor R3 and a zener diode V3, which limits a control voltage $U_{St}$ which is present between the gate connection and the source connection of MOSFET V6, as well as, additionally
- a series circuit including a resistor R2 and a zener diode V4, which allows a current to flow only after undervoltage threshold value $U_U$ for input DC voltage $U_S$ has been reached.

Resistor R3 is called the parallel resistor in the following description, and zener diode V3 is called the limiting zener diode. Resistor R2 is called the series resistor in the following description, and zener diode V4 is called the undervoltage zener diode.

The source connection of MOSFET V6 is connected to positive input connection 1, and the drain connection is connected to positive output connection 3. The gate connection of MOSFET V6 is connected, on the one hand, via parallel circuit R3, V3 to positive input connection 1, and, on the other hand, via series circuit R2, V4 to negative input connection 2.

Negative input connection 2 and negative output connection 4 are directly connected to each other, so that the circuit can be implemented, in particular, even with only three external connections.

In the case of input DC voltages $U_E$ below undervoltage threshold value $U_U$, undervoltage zener diode V4 is reverse-biased. No current therefore flows through resistors R2, R3. In consequence, there is no voltage drop across parallel resistor R3, so that control voltage $U_{St}$ is zero. The entire input DC voltage $U_E$ thus drops between the source connection and the drain connection of MOSFET V6. There is therefore no voltage drop between output connections 3, 4, so that no output DC current $I_A$ flows through any load RL, CL which may be connected.

II) If input DC voltage $U_E$ rises above undervoltage threshold value $U_U$, then undervoltage zener diode V4 conducts. A current flows through resistors R2, R3. Control voltage $U_{St}$ is proportional to the current flowing through parallel resistor R3, and MOSFET V6 thus starts to conduct, so that an output DC current $I_A$, which is dependent on the magnitude of applied input DC voltage $U_E$, flows through a connected load RL, CL. The dimensioning of resistors R2, R3, in particular, is critical for the described response of the circuit. In the exemplary implementation, the resistors have values of 10 k$\Omega$ and 100 k$\Omega$Q, respectively.

III) If input DC voltage $U_E$ rises further, then the maximum possible output DC current $I_A^{max}$ rises suddenly upon reaching an activation threshold value $U_a$ for input DC voltage $U_E$.

This output response is achieved by the appropriate interaction of the following components, which are also contained in the current limiting circuit, and by the circuit already described:

A transistor Vs having a base connection and an emitter-collector path, which decouples undervoltage zener diode V4 in the switched-on state, as well as a voltage divider having a first and a second voltage divider resistor R4, R5.

Transistor VS is called the decoupling transistor in the following description.

The emitter-collector path of decoupling transistor VS is arranged in parallel with undervoltage zener diode V4. The base connection is connected, on the one hand, via first voltage divider resistor R4 to positive output connection 3, and, on the other hand, via second voltage divider resistor R5 to negative output connection 4.

A current also flows through voltage divider resistors R4, R5 when a current is flowing through MOSFET V6. If this rising current, which rises with input DC voltage $U_E$, reaches a specific level, then decoupling transistor VS becomes conductive, so that undervoltage zener diode V4 is decoupled, that is to say, is virtually short-circuited. The value of input DC voltage $U_E$ at which a sufficient current flows through voltage divider resistors R4, R5, so that decoupling transistor V5 becomes conductive, is called activation threshold value $U_a$. The dimensioning of voltage divider resistors R4, R5, in particular, is critical for the described response of the circuit. In the exemplary specific implementation, the resistors have values of 47 k$\Omega$ and 10 k$\Omega$, respectively.

The voltage which has dropped across undervoltage zener diode V4 before activation threshold value $U_a$ is reached, and thus up to immediately before the decoupling of undervoltage zener diode V4, then additionally suddenly drops across resistors R2 and R3. Thus the voltage across parallel resistor R3, and therefore control voltage $U_{St}$, rise suddenly. This leads to the maximum possible output DC current $I_A^{max}$ delivered by the current limiting circuit also rising suddenly.

If input DC voltage $U_E$ rises further, limiting zener diode V3 limits control voltage $U_{St}$ of MOSFET V6. The maximum current flowing through MOSFET V6, and thus, at the same time, output DC current $I_A$ flowing through connected load RL, CL, is thus likewise limited. In the specific implementation, maximum control voltage $U_{St}$ is fixed at 9.1 volts by the dimensioning of limiting zener diode V3. This results in the desired mode of operation of the current limiting circuit. The maximum possible output DC current $I_A^{max}$ thus remains essentially constant if input DC voltage $U_E$ is raised further.

IV) If input DC voltage $U_E$ exceeds an overvoltage threshold value $U_o$, then output DC current $I_A$ is zero.

This output response is achieved by the appropriate interaction of the following components, which are also contained in the current limiting circuit, and by the circuit which has already been described:

A series circuit including a resistor R1 and a zener diode V1, which allows the current to flow only after overvoltage threshold value $U_o$ for input DC voltage $U_E$ has been reached, as well as a transistor V2 having an emitter-collector path and a base connection, which prevents any voltage drop between the gate connection and source connection of MOSFET V6 if an input overvoltage is applied.

Resistor R1 is called the overvoltage resistor in the following description. Zener diode V1 is called the overvoltage zener diode in the following description. Transistor V2 is called the overvoltage transistor in the following description.

The emitter-collector path of overvoltage transistor V2 is arranged in parallel with limiting zener diode V3. The base connection is connected, on the one hand, via overvoltage resistor R1 to positive input connection 1, and, on the other hand, via overvoltage zener diode V1, which is connected in the reverse direction, to negative input connection 2.

Overvoltage zener diode V1 is dimensioned such that it conducts only from overvoltage threshold value $U_o$, which is above reference voltage $U_{Ref}$. Conversely, overvoltage zener diode V1 is reverse-biased when input DC voltage $U_E$ is below this overvoltage threshold value $U_o$.

If an overvoltage is applied, overvoltage zener diode V1 conducts the current. Consequently, the base of overvoltage transistor V2 becomes conductive, so that the gate connection and source connection of MOSFET V6 are virtually short-circuited. Control voltage $U_{St}$ of MOSFET V6 thus collapses, so that virtually no current flows through MOSFET V6 and thus, in the same way, virtually no output DC current $I_A$ flows through a connected load RL, CL. Consequently, the current limiting circuit delivers virtually no output DC current $I_A$ for input DC voltages $U_E$ above overvoltage threshold value $U_o$.

If the value of input DC voltage $U_E$ is reduced, starting from a voltage value which is above overvoltage threshold value $U_o$, then overvoltage zener diode V1 is initially reverse-biased upon reaching overvoltage threshold value $U_o$. Thus a control voltage $U_{St}$ again immediately arises between the gate connection and the source connection of MOSFET V6. As a result of the control voltage $U_{St}$, which is limited by limiting zener diode V3, only a limited maximum current can in turn flow through MOSFET V6, so that, in the same way, a limited maximum possible output DC current $I_A^{max}$ flows through a load RL, CL connected to output connections 3, 4. Since a sufficient current also flows via two voltage divider resistors R4, R5, in this case, the base of decoupling transistor V5 is conductive, so that undervoltage zener diode V4 is virtually short-circuited.

If input DC voltage $U_E$ is reduced, a sudden drop in the maximum possible output DC current $I_A^{max}$ only occurs below activation threshold value $U_a$ specifically on reaching notch threshold value $U_e$. Maximum output DC current $I_A^{max}$ thus creates a hysteresis. This hysteresis ensures that, when input DC voltages $U_E$ are above activation threshold value $U_a$, a significant maximum possible output DC current $I_A^{max}$ can continue to flow through load RL, CL in the event of small voltage notches. This is particularly important if input DC voltage $U_E$ is still below reference voltage $U_{Ref}$ when load RL, CL is connected. Even if input DC voltage $U_E$ briefly falls below activation threshold value $U_a$ in this context, but remains above notch threshold value $U_e$, the same maximum possible output DC current $I_A^{max}$ can always flow through load RL, CL. This stabilizes the circuit response.

If input DC voltage $U_E$ is reduced further, a position is finally reached in which limiting zener diode V3 blocks the current. Control voltage $U_{St}$ is in this case proportional to the current flowing through parallel resistor R3, and is thus dependent on input DC voltage $U_E$. As a result of control voltage $U_{St}$ being dependent on input DC voltage $U_E$, output DC current $I_A$ is also dependent on the input DC voltage $U_E$.

Undervoltage zener diode V4, in this context, remains decoupled as long as a sufficient current is flowing through voltage divider resistor R4, R5, so that the base of decoupling transistor V5 remains conductive.

If, in the event of input DC voltage $U_E$ being reduced further, the base of decoupling transistor V5 loses the conductive property, then current no longer flows via the emitter-collector path of decoupling transistor V5, so that a voltage drop occurs immediately across undervoltage zener diode V4. Since input DC voltage $U_E$ is already below undervoltage threshold value $U_U$ at this time, undervoltage zener diode V4 blocks the current flow, so that no current flows through series resistor R2 or parallel resistor R3. Control voltage $U_{St}$ thus is set to zero, so that no output DC current $I_A$ is delivered.

The current limiting circuit described is advantageously connected upstream of a voltage converter which is supplied with DC voltage, i.e., a so-called DC-DC converter. Such DC-DC converters are used, for example, in the system power supplies for programmable controllers.

What is claimed is:

1. A current limiting circuit connected to a load, comprising:
   a positive input connection coupled to a positive potential of an input DC voltage;
   a negative input connection coupled to a negative potential of the input DC voltage; and
   an output side having a positive output connection and a negative output connection, the output side providing an output DC voltage and a maximum possible output DC current, the maximum possible output DC current being dependent on the input DC voltage when the input DC voltage is below a predetermined threshold value and being essentially constant when the input DC voltage is above the predetermined threshold value, the load being connected to the output side,
   wherein, when the input DC voltage is raised from zero volts to a predetermined reference voltage, an output DC current flows through the load only when the input DC voltage rises to a value above an undervoltage threshold value, the undervoltage threshold value being less than the predetermined reference voltage,
   and wherein, when the input DC voltage is raised from zero volts to the predetermined reference voltage, the maximum possible output DC current suddenly rises when the input DC voltage exceeds an activation threshold value, the activation threshold value being less than the predetermined reference voltage.

2. The current limiting circuit according to claim 1, further comprising:
   a normally-off MOSFET having:
   a source connection connected to the positive input connection, a drain connection connected to the positive output connection, and a gate connection connected to the positive input connection via a parallel circuit, the parallel circuit including a parallel resistor and a limiting zener diode, the limiting zener diode having a first current flowing therethrough in a first direction and being connected in a second direction, the second direction being opposite to the first direction, the gate connection being further coupled to the negative input connection via a series circuit, the series circuit including a series resistor and an undervoltage zener diode, the undervoltage zener diode having a second current flowing therethrough in a third direction and being connected in a fourth direction, the fourth direction being opposite to the third direction, wherein the negative input connection is connected to the negative output connection.

3. The current limiting circuit according to claim 1, wherein the activation threshold value of the input DC voltage is greater than the undervoltage threshold value of the input DC voltage.

4. The current limiting circuit according to claim 1, wherein, when the input DC voltage is reduced from a predetermined voltage value to zero volts, the maximum possible output DC current suddenly falls only when the input DC voltage reaches a notch threshold value, the notch threshold value being less than the activation threshold value, and wherein the predetermined voltage value is greater than the activation threshold value.

5. The current limiting circuit according to claim 4, wherein the notch threshold value is less than the undervoltage threshold value.

6. The current limiting circuit according to claim 2, further comprising:
   a decoupling transistor including:
   an emitter-collector path connected in parallel with the undervoltage zener diode, and
   a base connection connected to the positive output connection via a first voltage divider resistor and connected to the negative output connection via a second voltage divider resistor.

7. The current limiting circuit according to claim 1, wherein no output DC current flows through the load as soon as the input DC voltage exceeds an overvoltage threshold value, the overvoltage threshold value being greater than the predetermined reference voltage.

8. The current limiting circuit according to claim 2, further comprising:
   an overvoltage transistor including:
   an emitter-collector path connected in parallel with the limiting zener diode,
   a base connection connected to the positive input connection via an overvoltage resistor and connected to the negative input connection via the overvoltage zener diode.

9. The current limiting circuit according to claim 1, wherein the current limiting circuit is connected to a voltage converter, the voltage converter being supplied with a DC voltage.

* * * * *